(12) United States Patent
Lauer

(10) Patent No.: US 8,934,893 B2
(45) Date of Patent: Jan. 13, 2015

(54) MESH NETWORK BASED AUTOMATED UPLOAD OF CONTENT TO AIRCRAFT

(75) Inventor: Bryan A. Lauer, Hinckley, IL (US)

(73) Assignee: Gogo LLC, Itasca, IL (US)

( * ) Notice: Subject to any disclaimer, the term of this patent is extended or adjusted under 35 U.S.C. 154(b) by 53 days.

(21) Appl. No.: 13/544,742

(22) Filed: Jul. 9, 2012

(65) Prior Publication Data

US 2014/0011441 A1    Jan. 9, 2014

(51) Int. Cl.
| | | |
|---|---|---|
| *H04B 7/185* | (2006.01) | |
| *H04W 8/24* | (2009.01) | |
| *H04H 20/71* | (2008.01) | |
| *H04H 20/62* | (2008.01) | |
| *H04H 20/40* | (2008.01) | |
| *H04H 60/80* | (2008.01) | |

(52) U.S. Cl.
CPC .............. *H04H 20/71* (2013.01); *H04H 20/62* (2013.01); *H04H 20/40* (2013.01); *H04H 60/80* (2013.01)
USPC .............. 455/431; 455/419; 455/420; 725/76

(58) Field of Classification Search
USPC ......... 725/76, 151; 455/419, 420, 431, 414.1; 370/316, 352
See application file for complete search history.

(56) References Cited

U.S. PATENT DOCUMENTS

| | | | |
|---|---|---|---|
| RE42,536 E * | 7/2011 | Leuca et al. .................. 370/316 |
| 2005/0208958 A1* | 9/2005 | Bahl et al. ..................... 455/509 |
| 2009/0077594 A1* | 3/2009 | Milosevski et al. ............. 725/76 |
| 2010/0291961 A1 | 11/2010 | Buga et al. | |
| 2010/0333164 A1* | 12/2010 | Schultz et al. ................ 725/151 |
| 2012/0030717 A1* | 2/2012 | Buga et al. ....................... 725/76 |
| 2012/0090011 A1* | 4/2012 | Ezaki et al. ...................... 725/76 |

OTHER PUBLICATIONS

International Search Report in related PCT Application No. PCT/US13/39634 dated Jul. 16, 2013, 3 pages.

* cited by examiner

*Primary Examiner* — Ominiyi Obayanju
*Assistant Examiner* — Farideh Madani
(74) *Attorney, Agent, or Firm* — Marshall, Gerstein & Borun LLP

(57) ABSTRACT

The Automated Content Upload System networks a plurality of aircraft together when they are parked at the gates of an airport. Communications among the aircraft are guided by a Content Manager, resident at or near the airport, which maintains data representative of InFlight Entertainment Content presently stored on each aircraft and the list of scheduled InFlight Entertainment Content available on each aircraft. The Content Manager guides the exchange of InFlight Entertainment Content among the aircraft, as well as from the Content Manager to the aircraft, to automatically distribute InFlight Entertainment Content to the aircraft efficiently and timely. This process includes the ability to multicast data from the Content Manager to multiple aircraft in a single transmission, obtaining content delivery efficiency, populating multiple aircraft via a single transmission from the Content Manager. Furthermore, the Content Manager can supplement this process via transmissions to the aircraft in flight over the Air-To-Ground link.

31 Claims, 5 Drawing Sheets

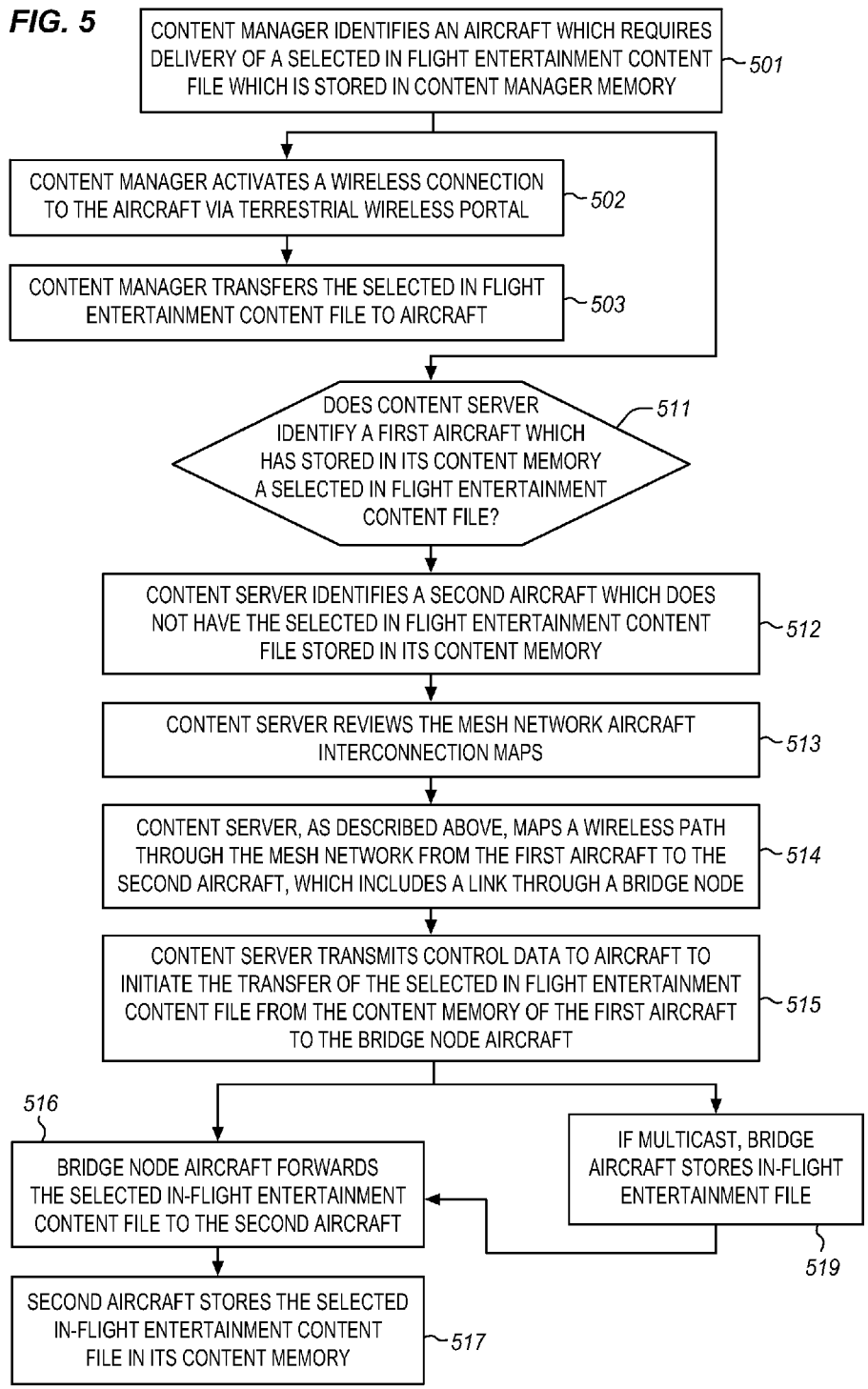

MESH NETWORK BASED AUTOMATED UPLOAD OF CONTENT TO AIRCRAFT

FIELD OF THE INVENTION

This invention relates to InFlight Entertainment Content which is delivered to passengers on an aircraft and, in particular, to a communication system that provides aircraft with high speed delivery of new InFlight Entertainment Content via a mesh network to enable InFlight Entertainment Content to be populated on the Content Manager which is located on the aircraft by wirelessly transferring InFlight Entertainment Content files from other aircraft or from a central Content Manager.

BACKGROUND OF THE INVENTION

It is a problem in the field of InFlight Entertainment to provide passengers on all the aircraft of a particular carrier with the most current In-Flight Entertainment Content for delivery either to the passenger's wireless personal communication devices or aircraft-based displays. Air-To-Ground communications, such as between an aircraft in flight and Air-To-Ground terrestrial sites, fails to provide sufficient bandwidth to transmit all of the InFlight Entertainment Content from the Air-To-Ground terrestrial sites to the aircraft in flight. As a result, InFlight Entertainment Content is typically manually loaded onto the InFlight Entertainment server which is located in each aircraft via portable media (USB sticks) when the aircraft is parked at an airport gate. Thus, every InFlight Entertainment Content update requires a visit to an aircraft by maintenance personnel. The two weaknesses with this method are the cost to distribute and swap the USB sticks, and the time it takes to accomplish this: the effort to create a new USB stick, ship, and swap the USB stick in all of the aircraft of a carrier takes about 3 to 4 weeks. This is an expensive and inefficient process, which is lacking in timeliness of InFlight Entertainment Content delivery. In addition, the coordination of these InFlight Entertainment Content deliveries is complex and prone to human error, especially since the aircraft are transient and can be rerouted to meet the needs of the airline or for weather/maintenance events.

Another method in loading InFlight Entertainment Content on the aircraft is via wireless download (3G Cellular/4G Cellular/WiFi connectivity). The issues with wireless connectivity are the data file size of InFlight Entertainment Content (1 GB/movie), the extent of wireless coverage, and the cost of wireless service; it can be very costly to go down this path vs. manually swapping out USB sticks. In addition, at a busy airport, the ability to concurrently transmit InFlight Entertainment Content to multiple aircraft while they sit at the gate is inconsistent.

Therefore, there presently is no reliable, effective, cost-efficient way of delivering InFlight Entertainment Content to aircraft.

BRIEF SUMMARY OF THE INVENTION

The above-described problems are solved and a technical advance achieved in the field by the present Mesh Network Based Automated Upload of Content To Aircraft (termed "Automated Content Upload System" herein) which functions to network a plurality of aircraft, and optionally user wireless personal communication devices, together when they are on the ground at an airport, typically when parked at the gates of an airport. The communications among the aircraft are guided by a Content Manager, typically resident at or near the airport, which maintains data representative of the InFlight Entertainment Content presently stored on each aircraft, as well as the list of scheduled InFlight Entertainment Content that is to be available on each aircraft. The Content Manager guides the exchange of InFlight Entertainment Content data among the aircraft as well as from the Content Manager to the aircraft to automatically distribute InFlight Entertainment Content to the aircraft in an efficient and timely manner. Included in this process is the ability to multicast data from the Content Manager to multiple aircraft in a single transmission, thereby obtaining InFlight Entertainment Content delivery efficiency by populating multiple aircraft via a single transmission from the Content Manager. Furthermore, the Content Manager can supplement this process via transmissions to the aircraft, when in flight, over the existing Air To Ground link. Finally, the users' portable wireless personal communication devices, such as those belonging to aircraft crew, passengers, and the like (collectively termed "users" herein), can be made a temporary node in the mesh network and used to transport content onboard the aircraft or function as a relay point between a source and the next device in the network, as is described below.

In addition, the term "InFlight Entertainment Content" includes movies, music, WEB pages, catalogs, magazines, and any other data that the aircraft passengers may wish to view on their wireless personal communication devices while in flight on the aircraft.

BRIEF DESCRIPTION OF THE DRAWINGS

FIG. 5 illustrates, in flow diagram form, the operation of the Automated Content Upload System in loading InFlight Entertainment Content to multiple aircraft located at an airport.

DETAILED DESCRIPTION OF THE INVENTION

Figure 1:
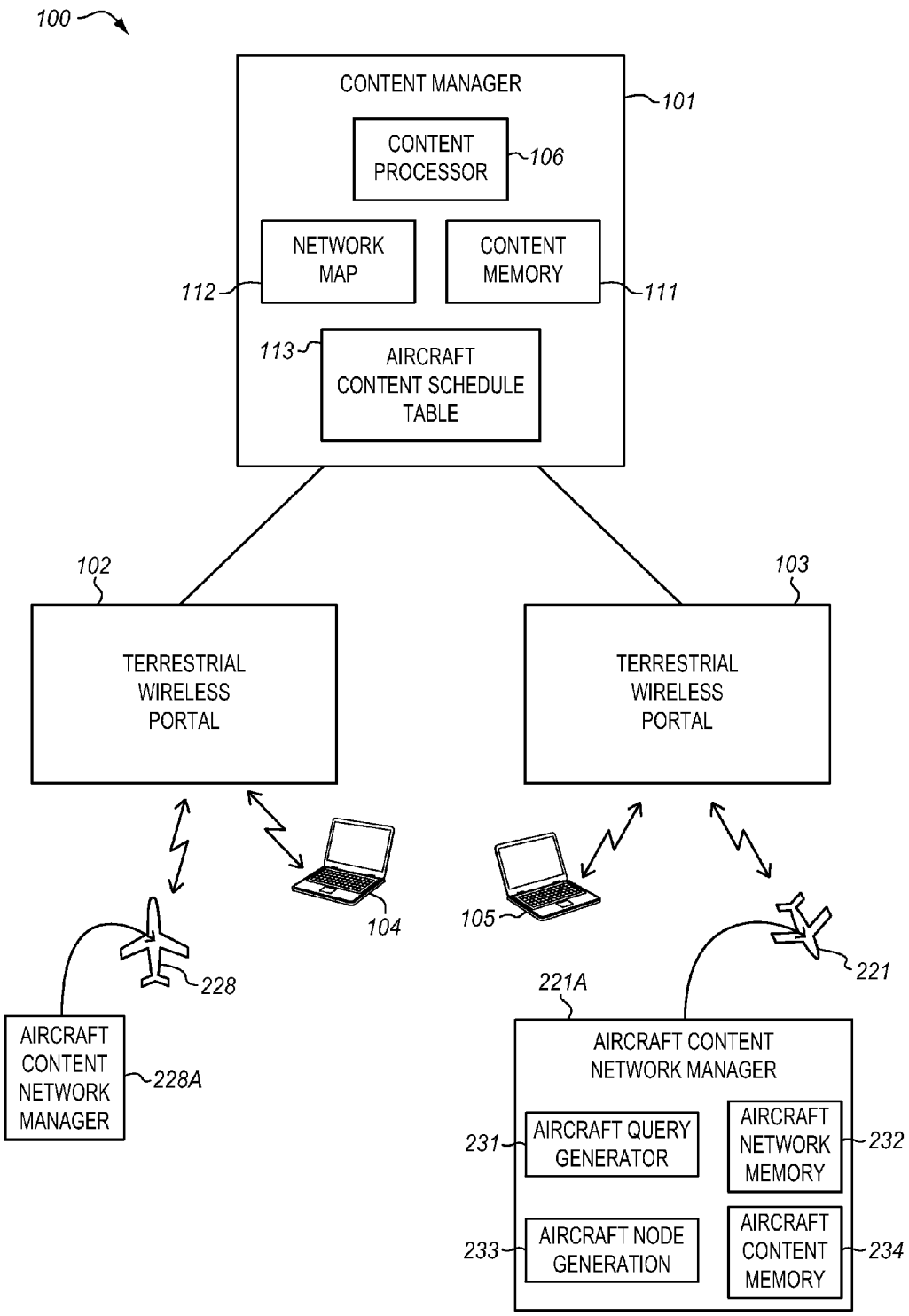
FIG. 1 illustrates the Automated Content Upload System in block diagram form.

The Automated Content Upload System 100 functions to network a plurality of Aircraft 221-228 together when they are located at an airport and/or parked at the Gates 211G, 212G of an airport. FIG. 1 illustrates the Automated Content Upload System 100 in block diagram form. The Automated Content Upload System 100 includes a Content Manager 101, which is the repository of InFlight Entertainment Content, as well as the source of control of the mesh network that is established among the aircraft parked at the airport. The Automated Content Upload System 100 also includes one or more Terrestrial Wireless Portals 102, 103 which provide the radio frequency links between the Content Manager 101 and the Aircraft 221-228 (as well as users' Wireless Personal Communication Devices 104, 105).

The Content Manager 101 guides the exchange of InFlight Entertainment Content data among the Aircraft 221-228 as well as from the Content Manager 101 to the Aircraft 221-228 to automatically distribute InFlight Entertainment Content to the Aircraft 221-228 in an efficient and timely manner. The Automated Content Upload System 100 has a plurality of the following attributes:

1. Locate, identify and communicate with all aircraft (network nodes) via Terrestrial Wireless Portals;
2. Perform network registration of each aircraft in an autonomous, automatic manner;
3. Authenticate aircraft (network nodes) on the network to ensure they are legitimate network nodes;
4. Establish regular "all is well" internal communications to verify network health;
5. Establish self-test algorithms in order to verify network functionality;
6. Able to relay data from aircraft to the next; and
7. Able to download content data to multiple aircraft even though data entry into the network is at a single point.
8. Locate, identify, and authenticate users for qualification as temporary mobile nodes in the network.

Network Topology

A mesh network is a local area network (LAN) that employs one of two connection arrangements: full mesh topology or partial mesh topology. In the full mesh topology, each node is connected directly to each of the others. In the partial mesh topology, some nodes may be connected to all the others, but some of the nodes are connected only to those other nodes with which they exchange the most data. The mesh network topology is a peer-to-peer system where a node can send and receive messages, but each node also functions as a router and can relay messages for its neighbors. Through this relaying process, a packet of data finds its way to its ultimate destination, passing through intermediate nodes with reliable communication links. If node fails in this network, the messages are automatically routed through alternative paths.

Physical Orientation of the Network

As shown in FIG. 1, the Automated Content Upload System 100 includes not only a processor, termed Content Manager 101, but also one or more Terrestrial Wireless Portals 102, 103 which function to wirelessly communicate with the Aircraft 221-228. The Content Manager 101 includes an associated Content Memory 111 which functions to store InFlight Entertainment Content for distribution to Aircraft 221-228 as well as a Network Map 112 which identifies the communication connections among the Aircraft 221-228 and, optionally, users' Wireless Personal Communication Devices 104, 105. The Content Manager 101 also includes an Aircraft Content Schedule Table 113 which lists data that identifies the individual aircraft and the content that is presently scheduled to be resident in this aircraft's Aircraft Content Memory 234. Thus, Content Manager 101 can determine what content needs to be loaded on a particular Aircraft 221 by comparing a list of content presently stored in this aircraft's Aircraft Content Memory 234 and content presently scheduled to be resident in this aircraft's Aircraft Content Memory 234 as noted in Aircraft Content Schedule Table 113.

Each Aircraft 221-228 includes an Aircraft Content Network Manager 221A that consists of a server which implements the aircraft-centric portion of the Automated Content Upload System 100. The Aircraft Content Network Manager 221A includes an Aircraft Content Memory 234 that stores the content for distribution to the passengers onboard this aircraft. The Aircraft Content Network Manager 221A also includes an Aircraft Query Generator 231 for wirelessly polling nearby aircraft to establish and update the mesh network that is used to exchange content among the Aircraft 221-228 and from Content Manager 101 to identified Aircraft 221-228. Aircraft Network Memory 232 maintains a record of the nearby aircraft in wireless communication range of the Aircraft 221, and Aircraft Node Registration 233 is a process that shares the collected Aircraft Network Memory content and a list of content stored in the Aircraft Content Memory 234 with the Content Manager 101, as described below.

Figure 2:
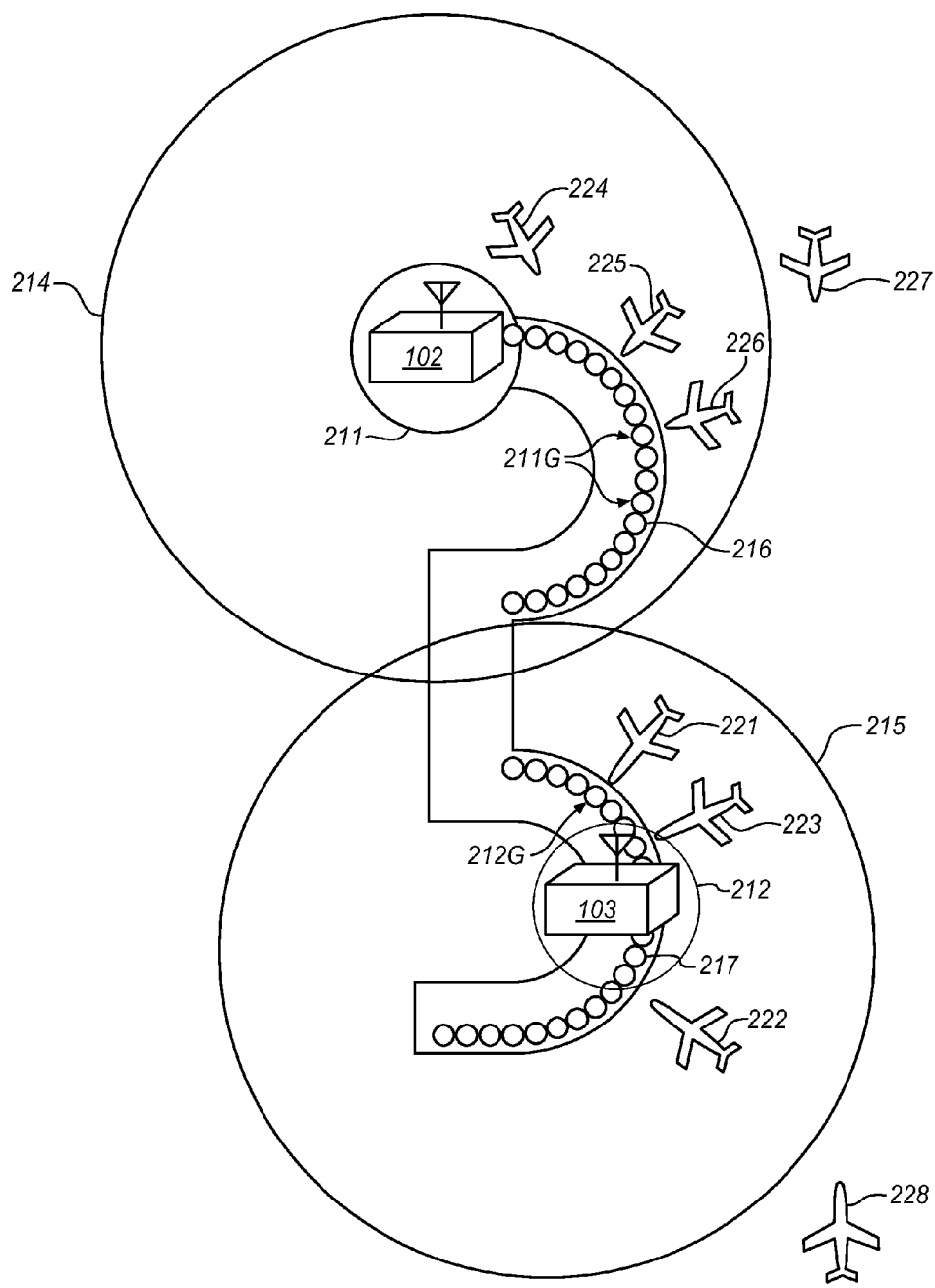
FIG. 2 illustrates a typical airport configuration with multiple aircraft parked at gates.

FIG. 2 illustrates a typical airport configuration with multiple Aircraft 221-228 parked at Gates 211G, 212G. Typically, but not necessarily, a Terrestrial Wireless Portal 102 may be physically installed at a location of an airport terminal building serving a plurality of gates, such as location 211 in the familiar 'multi-horseshoe' topography, diagrammatically illustrated in FIG. 1. Where an airport contains multiple terminals or has a large number of gates distributed over a substantial airport area, the airport may be equipped with one or more additional Terrestrial Wireless Portal 103 locations, shown at 212 in FIG. 1, in order to ensure complete gate coverage.

The locations of Terrestrial Wireless Portals 102, 103 are such that, regardless of its location, each of Aircraft 221-228 is assured of having a wireless terrestrial data link with a Terrestrial Wireless Portal 102, 103 of the Automated Content Upload System 100. The spacing between Terrestrial Wireless Portals 102, 103 is such as to provide overlapping terrestrial link communication coverage, as indicated by overlapping circles 214 and 215, whose respective radii encompass the entirety of their associated multi-gate areas 216 and 217.

Mesh Network Creation

In order to support communication among the Aircraft 221-228 and with the Content Manager 101, the mesh network must be established and periodically updated as aircraft arrive and depart from their respective gates and users flow through the terminals and aircraft. As an example, assume that a mesh network among Aircraft 221-226 and Content Manager 101 is established and presently active. The process of creation of a network can be understood by describing the process of adding a new node to an existing network and then extrapolating this process to the case where no network is initially active.

Figure 3:
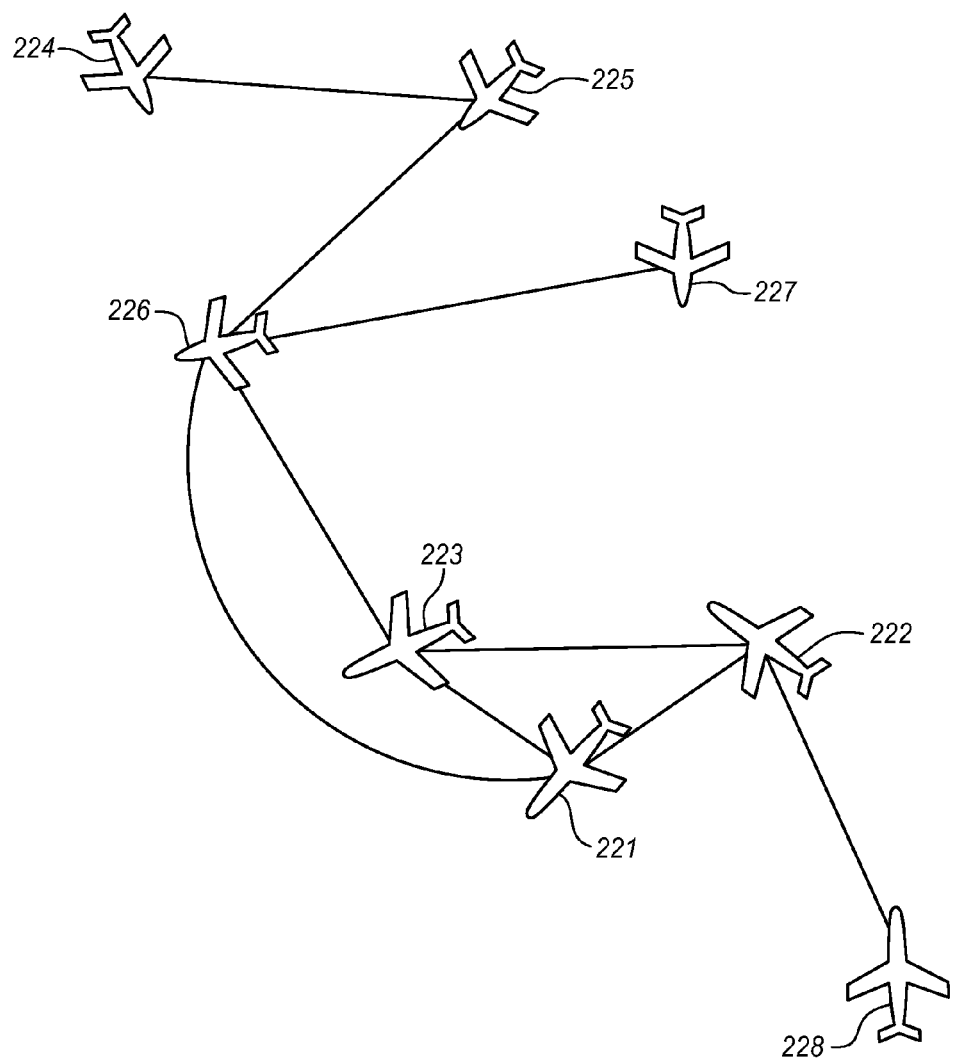
FIG. 3 illustrates a map of aircraft interconnections in the network.
Figure 4:
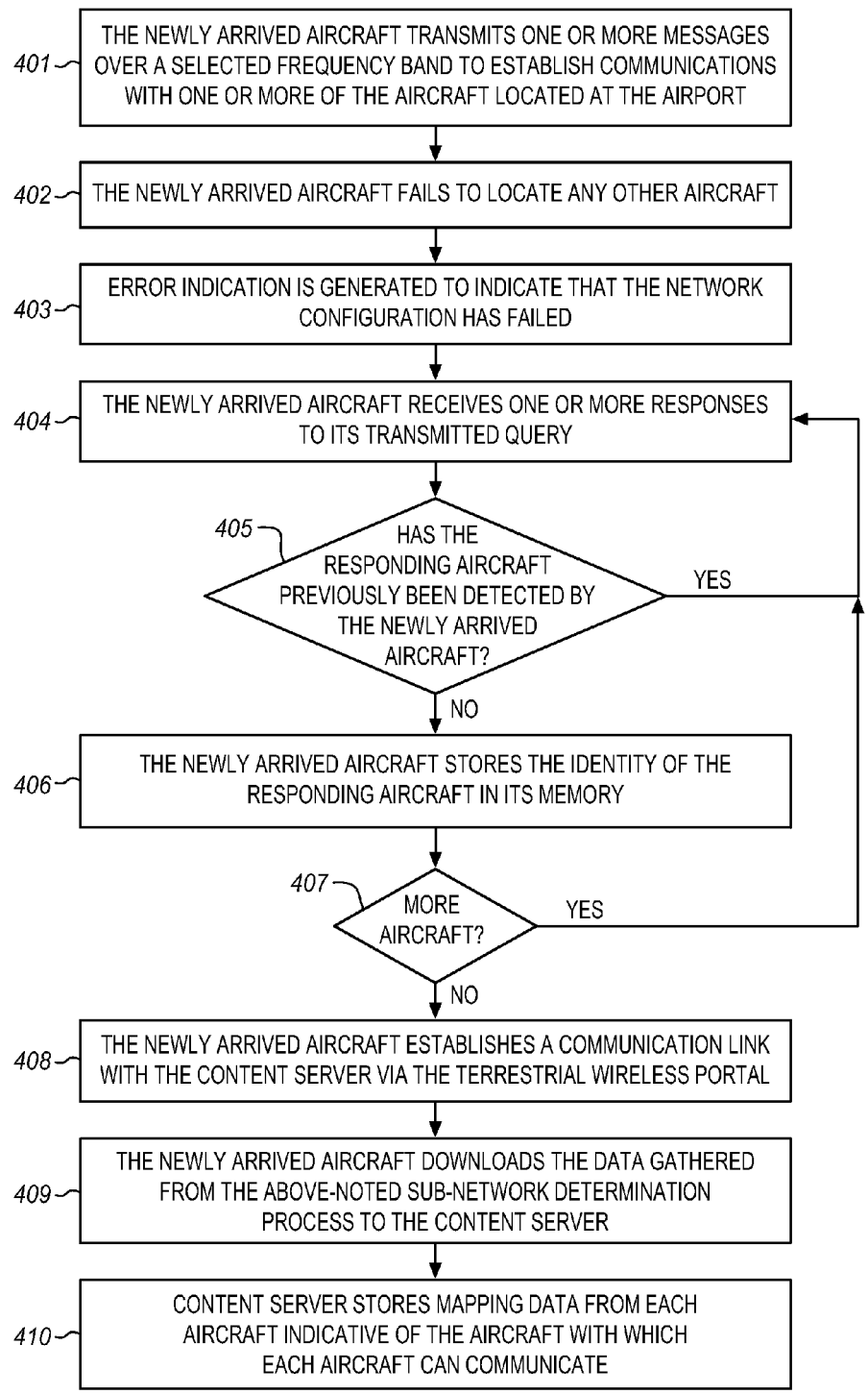
FIG. 4 illustrates in flow diagram form the operation of the Automated Content Upload System in defining wireless interconnections among multiple aircraft located at an airport.

FIG. 4 illustrates in flow diagram form the operation of the Automated Content Upload System 100 in defining wireless interconnections among multiple Aircraft 221-228 located at an airport, as shown diagrammatically in FIG. 3. This process of adding a node to the network entails the newly arrived Aircraft 221 at step 401 activating Aircraft Query Generator 231 to transmit one or more messages over a selected frequency band to establish communications with one or more of the Aircraft 222 located at the airport. If, at step 402, the newly arrived Aircraft 221 fails to locate any other aircraft, then this is an error condition, since the network must contain two or more nodes. Therefore, processing advances to step 403 where an error indication is generated to indicate that the network configuration has failed.

Otherwise, at step 404, the newly arrived Aircraft 221 receives one or more responses to its transmitted query and stores the identity of the responding Aircraft 222, 223 in its Aircraft Network Memory 232 at step 405. If this responding Aircraft (222, for example) has not previously been detected by the newly arrived Aircraft 221, then the number of primary proximate nodes has changed and processing returns to step 404 where the next responsive response (from Aircraft 223, for example) is received and analyzed as noted above. The steps 404-406 are repeated until all of the responses received by newly arrived Aircraft 221 have been processed. At this juncture, all of the Aircraft 222, 223 that are proximate to the newly arrived Aircraft 221 are identified and their identities stored in the Aircraft Network Memory 232 of newly arrived Aircraft 221. The identified nodes that are proximate to and communicable with newly arrived Aircraft 221 form the subnetwork for the newly arrived Aircraft 221 within the composite mesh network. In a like manner, all individual Aircraft 222 to 223 have their own sub-networks of nodes which are respectively communicable to themselves, respectively.

The newly arrived Aircraft 221 then activates Aircraft Node Registration 233 to establish a communication link at step 407 with the Content Manager 101 via the Terrestrial Wireless Portal 102. The newly arrived Aircraft 221 downloads the data gathered from the above-noted sub-network determination process and stored in Aircraft Network Memory 232 to the Content Manager 101, which stores mapping data in Network Map 112 from each aircraft indicative of the other airport resident aircraft with which each aircraft can communicate. The Content Manager 101 maintains a multi-dimensional map which charts the interconnections among the aircraft that support the exchange of data. FIG. 3 illustrates a map of aircraft interconnections in the network as stored in Network Map 112.

For the sake of simplicity, the incorporation of users' wireless personal communication devices 104, 105 into the mesh network is not described, although the process is substantially the same as that articulated for aircraft. Since crew members can be identified and their respective flight assignments pre-determined, it is advantageous to load content onto their wireless personal communication devices and have these devices propagate content as the crew members move among their respective aircraft assignments. Thus, the propagation of content is significantly enhanced by the addition of a multitude of crew members to the content propagation process. In addition, the crew members' wireless personal communication devices can upload content to the aircraft while the crew member is onboard and the aircraft is in flight. Thus, the temporal and spatial extent of the content loading process is expanded, even though the aircraft has left the terminal, since the content load process continues.

The following description is aircraft-centric for simplicity of description, but the use of the term "aircraft" can include users' wireless personal communication devices as one embodiment of a content delivery node. This node is mobile and is not constrained to be located at a particular gate in the terminal; in fact, it is expected to roam throughout the airport and be resident in various aircraft and at various gates during their tenure at this airport. Thus, the users' wireless personal communication devices are part of the network in the form of mobile repositories of content, with their physical movement from one aircraft to another or from the airport terminal to an aircraft results in the content being available to load into the content memory of the aircraft on which the user is located. Thus, the users' wireless personal communication devices typically do not "store and forward" content via wireless links as the aircraft do; they do store content and manually position themselves inside an aircraft to download the content to the aircraft content memory.

Content Data Distribution

FIG. 5 illustrates in flow diagram form the operation of the Automated Content Upload System 100 in loading InFlight Entertainment Content to multiple aircraft located at an airport. In the Automated Content Upload System 100, as described above, aircraft associate with other aircraft at the gates via aircraft-to-aircraft wireless links. Thus, each aircraft has a "thin link" to the Content Manager 101 via the Terrestrial Wireless Portal 102, 103 and a fat WiFi pipe to the aircraft it is meshed with. At this point, the Content Manager 101 pushes data to specific aircraft via the Terrestrial Wireless Portal 102, 103; and these aircraft push the received content (or content already stored on the aircraft) to other aircraft, as identified to the aircraft, via the WiFi mesh.

The Content Manager 101 stores each aircraft's location, mesh connectivity, mesh link performance, Terrestrial Wireless Portal link performance, as well as a list of content that is stored on the aircraft and a list of content that presently should be stored on the aircraft. The Content Manager 101 also knows the Terrestrial Wireless Portal 102, 103 data budget remaining for the month.

Thus, at step 501, Content Processor 106 of the Content Manager 101 identifies an Aircraft 221 which requires delivery of a selected InFlight Entertainment Content file which is stored in Content Manager Memory 111. Content Processor 106 makes this determination by comparing a list of content presently stored in this aircraft's Aircraft Content Memory 234 and content presently scheduled to be resident in this aircraft's Aircraft Content Memory 234 as noted in Aircraft Content Schedule Table 113. Content Manager 101, at step 502, activates a wireless connection to Aircraft 221 via Terrestrial Wireless Portal 103. Content Manager 101 then, at step 503, transfers the selected InFlight Entertainment Content file to Aircraft 221 via Terrestrial Wireless Portal 103. Another file transfer mode is executed airplane-to-airplane when Content Manager 101 at step 511 identifies a first Aircraft 228 which has stored in its content memory a selected InFlight Entertainment Content file. At step 512, the Content Manager 101 identifies a second Aircraft 221 which does not have the selected InFlight Entertainment Content file stored in its content memory. At step 513, Content Manager 101 reviews the mesh network aircraft interconnection maps, as described above and, at step 514, maps a wireless path through the mesh network from the first Aircraft 228 to the second Aircraft 221, which includes a link through a bridge node (Aircraft 222) to enable the data transfer to take place. Content Manager 101, at step 515, transmits control data to Aircraft 221, 222, and 228 to initiate the transfer of the selected InFlight Entertainment Content file from the content memory of the first Aircraft 228 to the bridge node Aircraft 222 at step 516, which forwards the selected InFlight Entertainment Content file to the second Aircraft 221 at step 517, which stores the selected InFlight Entertainment Content file in its Aircraft Content Memory 334 at step 518.

Since the bandwidth of the aircraft-to-aircraft WiFi link is greater than the bandwidth of the Terrestrial Wireless Portals 102, 103, the transfer of the selected InFlight Entertainment Content file as described above is effected more quickly. In addition, the use of the aircraft as data transfer elements reduces the processing load on the Content Manager 101. Furthermore, Content Manager 101 can use data multicasting to transfer the selected InFlight Entertainment Content file to multiple target aircraft in a single file transfer operation. Thus, Content Manager 101 in the transmission of control data to Aircraft 221, 222, and 228 at step 515 defines a data multicast mode, rather than a point-to-point transmission as described above. This control data causes the first Aircraft 228 to initiate the transfer of the selected InFlight Entertainment Content file from the content memory of the first Aircraft 228 to the bridge node Aircraft 222 at step 516, which stores the selected InFlight Entertainment Content file in its content memory at step 519 and forwards the selected InFlight Entertainment Content file to the second Aircraft 221 at step 517, which stores the selected InFlight Entertainment Content file in its Aircraft Content Memory 334 at step 518.

The Content Manager 101 typically has a plurality of design goals:

1. Minimize the amount of content downloaded over the Terrestrial Wireless Portal;

2. Minimize time to get content on aircraft;
3. Ability to prioritize content distribution (what is high priority, what is low);
4. Each aircraft checks neighboring aircraft inventory and synchronizes/updates content without the need for Content Manager interaction; and
5. File Transfer methods must support frequent breaks in connectivity and file transfer resumption from different sources (servers).

Summary

The Automated Content Upload System networks a plurality of aircraft together when they are on the ground at an airport, typically when parked at the gates of an airport. The communications among the aircraft are guided by a Content Manager which maintains data representative of the InFlight Entertainment Content presently stored on each aircraft, as well as the list of scheduled InFlight Entertainment Content that is to be available on each aircraft. The Content Manager guides the exchange of InFlight Entertainment Content data among the aircraft, as well as from the Content Manager to the aircraft to automatically distribute InFlight Entertainment Content to the aircraft in an efficient and timely manner.

What is claimed as new and desired to be protected by Letters Patent of the United States is:

1. An automated content upload system for delivering content to a plurality of aircraft which are present at an airport that is served by the automated content upload system, comprising:
   at least one terrestrial wireless portal for establishing bidirectional data communications links with the plurality of aircraft;
   a content manager for storing aircraft content data, connected to the at least one terrestrial wireless portal for exchanging the aircraft content data with at least one of the plurality of aircraft via the at least one terrestrial wireless portal;
   an aircraft content network manager, resident in each of the plurality of aircraft, comprising:
      an aircraft content memory for storing the aircraft content data for distribution to passengers onboard the each of the plurality of aircraft,
      an aircraft query generator for detecting a presence of any other aircraft by transmitting a wireless query on a predetermined frequency band,
      an aircraft network memory for storing identities of aircraft that respond to the transmitted wireless query to define an aircraft sub-network comprising the identified aircraft and the aircraft that respond to the transmitted wireless query,
      a user wireless personal communication device query for detecting a presence of user wireless personal communication devices and aircraft content data stored therein,
      an aircraft node registration for transmitting aircraft data, indicative of aircraft content data stored in the aircraft content memory, the aircraft content data stored in the detected user wireless personal communication devices and data indicative of the aircraft connected to the aircraft sub-network, to the content manager via the at least one terrestrial wireless portal,
      user wireless personal communication device content retrieval for transmitting the aircraft content data from a memory of the detected user wireless personal communication devices to the aircraft content memory; and
   wherein the content manager comprises a content processor which is responsive to receipt of the aircraft data from the aircraft node registration, indicative of the aircraft content data stored in the aircraft content memory, the aircraft content data stored in the detected user wireless personal communication devices and transmitted to the aircraft content memory and the data indicative of the aircraft connected to the aircraft sub-network, for transmitting control signals to a first aircraft to activate the first aircraft to wirelessly distribute identified aircraft content data that is stored in the aircraft content memory of the first aircraft to a second aircraft.

2. The automated content upload system of claim 1 wherein said content manager further comprises:
   an aircraft content schedule table for storing data indicative of aircraft content data presently scheduled to be resident in an aircraft's aircraft content memory.

3. The automated content upload system of claim 2 wherein said content processor compares a list of aircraft content data presently stored in an aircraft's aircraft content memory and the aircraft content data presently scheduled to be resident in this aircraft's content memory as noted in the aircraft content schedule table.

4. The automated content upload system of claim 1 further comprising:
   wherein the content manager defines a wireless path from the first aircraft to the second aircraft, the wireless path optionally including at least one additional aircraft which functions as a bridge between the first aircraft and the second aircraft.

5. The automated content upload system of claim 1 further comprising:
   wherein the content manager multicasts the aircraft content data to multiple aircraft by transmitting the aircraft content data via a terrestrial wireless portal to a first aircraft in a series of aircraft, each of which stores and forwards the aircraft content data or functions as a bridge to pass the aircraft content data along the defined wireless path.

6. The automated content upload system of claim 1 further comprising:
   network expansion, for activating aircraft query to detect the presence of any other aircraft located at the airport.

7. The automated content upload system of claim 1 further comprising:
   wherein the content manager transmits the aircraft content data to an aircraft by transmitting the aircraft content data via a wireless air-to-ground link.

8. The automated content upload system of claim 1 wherein the content manager further comprises:
   user wireless personal communication device content distribution for transmitting the aircraft content data to the memory of the user wireless personal communication devices via the at least one terrestrial wireless portal.

9. An automated content upload method for delivering content to a plurality of aircraft which are present at an airport that is served by an automated content upload system, comprising the steps of:
   establishing bidirectional data communications links with the plurality of aircraft via at least one terrestrial wireless portal;
   transmitting aircraft content data from a content manager, having a content memory for storing the aircraft content data, connected to the at least one terrestrial wireless portal, to at least one of the plurality of aircraft via the at least one terrestrial wireless portal;
   operating an aircraft content manager, resident in each of the plurality of aircraft which have an aircraft content memory for storing the aircraft content data for distribution to passengers on the each of the plurality of aircraft, comprising:
  transmitting a wireless query on a predetermined frequency band to detect a presence of any other aircraft,
  storing identities of aircraft that respond to the transmitted wireless query in an aircraft network memory to define an aircraft sub-network comprising the identified aircraft and the aircraft that respond to the transmitted wireless query,
  detecting a presence of user wireless personal communication devices and aircraft content data stored therein,
  transmitting the aircraft content data from a memory of the detected user wireless personal communication devices to the aircraft content memory, and
  transmitting aircraft data indicative of aircraft content data stored in the aircraft content memory, the aircraft content data stored in the detected user wireless personal communication devices and data indicative of the aircraft connected to the aircraft sub-network to the content manager via the at least one terrestrial wireless portal; and
  transmitting control signals from the content manager, in response to receipt of the aircraft data indicative of the aircraft content data stored in the aircraft content memory, the aircraft content data stored in the detected user wireless personal communication devices and transmitted to the aircraft content memory and the data indicative of the aircraft connected to the aircraft sub-network, for transmitting control signals to a first aircraft to activate the first aircraft to wirelessly distribute identified aircraft content data that is stored in the aircraft content memory of the first aircraft to a second aircraft.

10. The automated content upload method of claim 9 wherein said step of operating the aircraft content manager further comprises:
  storing data, indicative of aircraft content data presently scheduled to be resident in an aircraft's aircraft content memory, in an aircraft content schedule table.

11. The automated content upload method of claim 9 wherein said step of transmitting comprises:
  comparing a list of aircraft content data presently stored in the aircraft's aircraft content memory and the aircraft content data presently scheduled to be resident in the aircraft's aircraft content memory as noted in the aircraft content schedule table.

12. The automated content upload method of claim 9 further comprising the step of:
  defining, in the content manager, a wireless path from the first aircraft to the second aircraft, the wireless path optionally including at least one additional aircraft which functions as a bridge between the first aircraft and the second aircraft.

13. The automated content upload method of claim 9 further comprising the step of:
  multicasting, from the content manager, the aircraft content data to multiple aircraft by transmitting the aircraft content data via a terrestrial wireless portal to a first aircraft in a series of aircraft, each of which stores and forwards the aircraft content data or functions as a bridge to pass the aircraft content data along the defined wireless path.

14. The automated content upload system of claim 9 further comprising the step of:
  activating aircraft query to detect the presence of any other aircraft located at the airport.

15. The automated content upload system of claim 9 further comprising the step of:
  wherein the content manager transmits the aircraft content data to an aircraft by transmitting the aircraft content data via a wireless air-to-ground link.

16. An automated content upload system for delivering content to a plurality of aircraft which are present at an airport that is served by the automated content upload system, comprising:
  a terrestrial wireless portal for establishing a bidirectional data communications link with an aircraft;
  a content manager, having a content memory for storing aircraft content data, connected to the terrestrial wireless portal for exchanging the aircraft content data with the aircraft via the terrestrial wireless portal;
  an aircraft content network manager, resident in the aircraft, comprising:
    an aircraft content memory for storing the aircraft content data for distribution to passengers onboard the aircraft,
    an aircraft query generator for detecting a presence of any other aircraft by transmitting a wireless query on a predetermined frequency band,
    an aircraft network memory for storing identities of aircraft that respond to the transmitted wireless query to define an aircraft sub-network comprising the aircraft and the aircraft that respond to the transmitted wireless query,
    a user wireless personal communication device query for detecting a presence of user wireless personal communication devices and aircraft content data stored therein,
    user wireless personal communication device content retrieval for transmitting the aircraft content data from a memory of the detected user wireless personal communication devices to the aircraft content memory; and
  wherein the content manager is responsive to aircraft data indicative of aircraft content data stored on the aircraft, the aircraft content data stored in the detected user wireless personal communication devices and transmitted to the aircraft content memory and data indicative of wireless connectivity between the aircraft and a second aircraft via the aircraft sub-network for transmitting control signals to the aircraft to activate the aircraft to wirelessly distribute identified aircraft content data stored in its aircraft content memory to the second aircraft via an aircraft-to-aircraft wireless link.

17. The automated content upload system of claim 16 further comprising:
  an aircraft node registration for transmitting aircraft data, indicative of aircraft content data stored in the aircraft content memory, the aircraft content data stored in the detected user wireless personal communication devices and data indicative of the aircraft connected to the aircraft sub-network, to the content manager via the terrestrial wireless portal.

18. The automated content upload system of claim 17 wherein said content manager further comprises:
  an aircraft content schedule table for storing data indicative of aircraft content data presently scheduled to be resident in the aircraft's content memory.

19. The automated content upload system of claim 17 wherein said content manager compares a list of aircraft content data presently stored in the aircraft's content memory and the aircraft content data presently scheduled to be resident in the aircraft's content memory as noted in the aircraft content schedule table.

20. The automated content upload system of claim 16 further comprising:
wherein the content manager defines a wireless path from the aircraft to the second aircraft, the wireless path via the aircraft-to-aircraft wireless link optionally including at least one additional aircraft which functions as a bridge between the aircraft and the second aircraft.

21. The automated content upload system of claim 16 further comprising:
wherein the content manager multicasts the aircraft content data to multiple aircraft by transmitting the aircraft content data via the terrestrial wireless portal to a first aircraft in a series of aircraft, each of which stores and forwards the aircraft content data or functions as a bridge to pass the aircraft content data along the defined path via the aircraft-to-aircraft wireless link.

22. The automated content upload system of claim 16 further comprising:
network expansion for activating aircraft query to detect the presence of any other aircraft located at the airport.

23. The automated content upload system of claim 16 further comprising:
wherein the content manager transmits the aircraft content data to the aircraft via a wireless air-to-ground link.

24. An automated content upload method for delivering content to a plurality of aircraft which are present at an airport that is served by an automated content upload system comprising the steps of:
establishing a bidirectional data communications link with an aircraft via a terrestrial wireless portal;
transmitting aircraft content data from a content manager, having a content memory for storing the aircraft content data and connected to the terrestrial wireless portal, to the aircraft via the terrestrial wireless portal;
operating an aircraft content manager, resident in the aircraft and having an aircraft content memory for storing the aircraft content data for distribution to passengers on the aircraft, comprising:
transmitting a wireless query on a predetermined frequency band to detect a presence of any other aircraft,
storing identities of aircraft that respond to the transmitted wireless query in an aircraft network memory to define an aircraft sub-network comprising the identified aircraft and the aircraft that respond to the transmitted wireless query,
detecting a presence of user wireless personal communication devices and aircraft content data stored therein,
transmitting the aircraft content data from a memory of the user wireless personal communication devices to the aircraft content memory; and
transmitting from the content manager, responsive to aircraft data indicative of aircraft content data stored on the aircraft, the aircraft content data stored in the detected user wireless personal communication devices and transmitted to the aircraft content memory and data indicative of wireless connectivity between the aircraft and a second aircraft for transmitting control signals to the aircraft to activate the aircraft to wirelessly distribute identified aircraft content data stored in its aircraft content memory to the second aircraft via an aircraft-to-aircraft wireless link.

25. The automated content upload method of claim 24, further comprising:
transmitting aircraft data indicative of aircraft content data stored in the aircraft content memory and data indicative of the aircraft sub-network to the content manager via the terrestrial wireless portal.

26. The automated content upload method of claim 25, further comprising the step of:
defining, in the content manager, a wireless path from the aircraft to the second aircraft, the wireless path via the aircraft-to-aircraft wireless link optionally including at least one additional aircraft which functions as a bridge between the aircraft and the second aircraft.

27. The automated content upload method of claim 25, further comprising the step of:
multicasting, from the content manager, the aircraft content data to multiple aircraft by transmitting the aircraft content data via the terrestrial wireless portal to a first aircraft in a series of aircraft, each of which stores and forwards the aircraft content data or functions as a bridge to pass the aircraft content data along the defined wireless path via the aircraft-to-aircraft wireless link.

28. The automated content upload method of claim 25, further comprising the step of:
activating aircraft query to detect the presence of any other aircraft located at the airport.

29. The automated content upload method of claim 25, further comprising the step of:
transmitting, from the content manager, the aircraft content data to the aircraft via a wireless air-to-ground link.

30. The automated content upload system of claim 16, further comprising:
user wireless personal communication device content distribution for transmitting the aircraft content data to the memory of the user wireless personal communication devices via the terrestrial wireless portal.

31. The automated content upload method of claim 24, further comprising:
distribution for transmitting the aircraft content data to the memory of the user wireless personal communication devices via the terrestrial wireless portal.

* * * * *